Sept. 24, 1940. J. R. BROWN ET AL 2,215,660
LIQUID GAUGE APPARATUS
Filed May 4, 1933
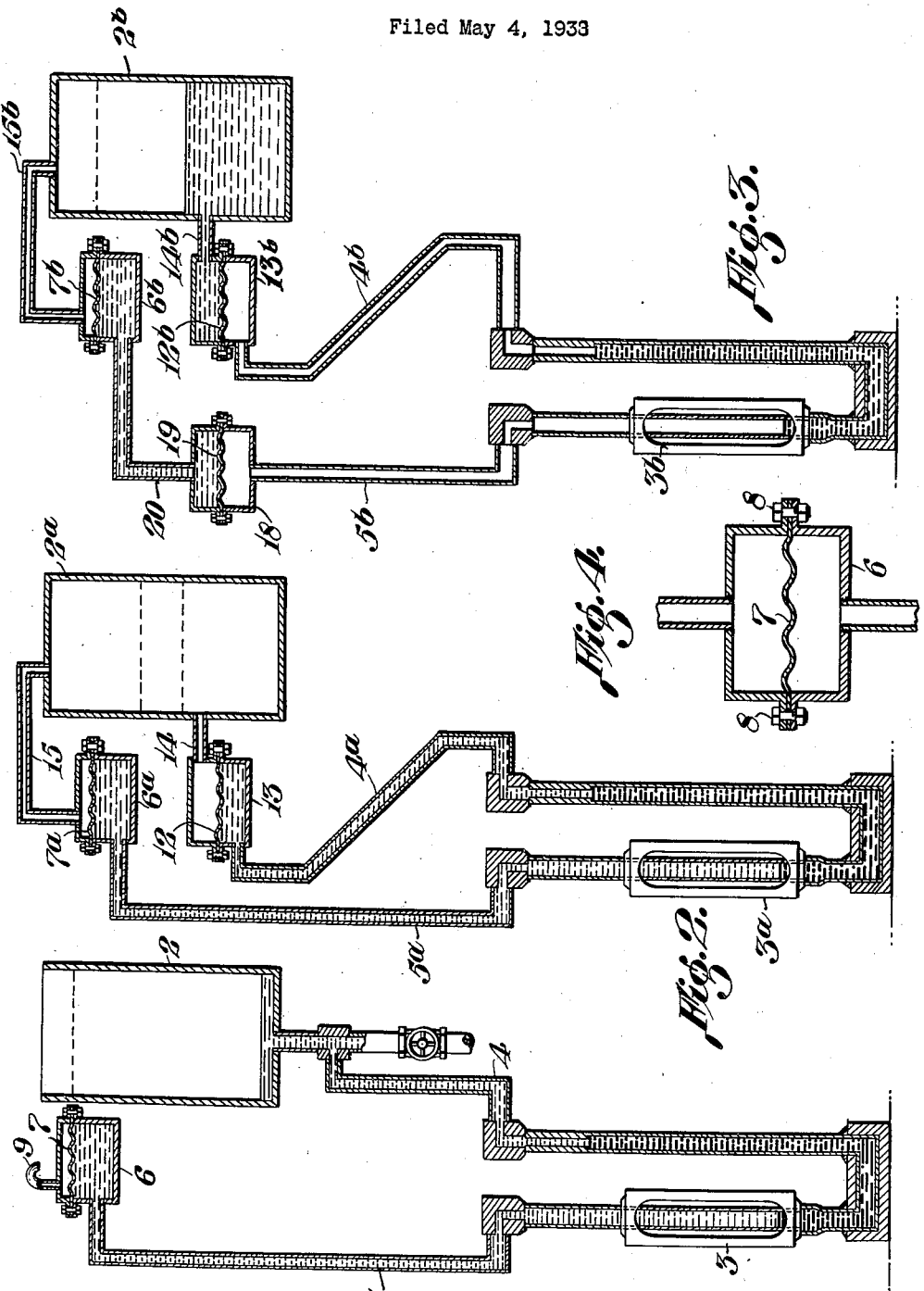
Inventors:
John Rowland Brown
and Dean H. Brownell
by Oberlin Limbach & Day
Attorneys Patented Sept. 24, 1940

2,215,660

UNITED STATES PATENT OFFICE 2,215,660

LIQUID GAUGE APPARATUS

John Rowland Brown, Cleveland, and Dean H. Brownell, Willoughby, Ohio, assignors to The Reliance Gauge Column Company, Cleveland, Ohio, a corporation of Ohio Application May 4, 1938, Serial No. 205,920

1 Claim. (Cl. 73—299)

This invention relates to liquid-level gauges, and more particularly those in which the viewing gauge is more or less remote from the liquid container to be gauged and having connection therewith by piping; and it is among the objects of the invention to provide a construction in which the gauge may be maintained in pressure communication and operative condition with the container even if the latter be subjected to maloperation or the material in the container be incompatible with that of the viewing gauge.

To the accomplishment of the foregoing and related ends, the invention, then, comprises the features hereinafter fully described, and particularly pointed out in the claim, the following description and the annexed drawing setting forth in detail certain illustrative embodiments of the invention, these being indicative however, of but a few of the various ways in which the principle of the invention may be employed.

In said annexed drawing:

Figs. 1, 2 and 3 are semi-diagrammatic elevational views illustrating the embodiments of the invention; and Fig. 4 is a sectional detail, on larger scale.

In customary practice with remote indicating gauges, there is a continuous fluid line from the container to the fluid of the viewing gauge, merely the latter being immiscible with the former and being in effect a slug of a dissimilar liquid interposed in the liquid supplied by the container. There arise however instances in which such construction is inapplicable, and remote-indicating gauging has until the present been impracticable in such instances.

In accordance with the present invention however, there is illustrated in Fig. 1 a container 2 which is to be gauged, and which is in the form of an open tank for instance, and connecting from the lower portion of the tank to a viewing gauge 3 is a conduit line 4 to communicate the fluctuating head or fluid as occurring in the tank, and from the other side of the gauge a conduit line 5 communicates a source of constant head or constant level. This latter is in the form of a housing 6, into which the lower portion of conduit line 5 connects, and in the housing is a means forming a closed boundary for the top of the liquid although being movable to a sufficient extent, such means for instance being a flexible diaphragm 7, as of rubber or suitable metal, Monel, etc., and the diaphragm being mounted by clamping its edges to the housing by suitable means, for instance clamping, as by screws or bolts 8, Fig. 4. The space above the diaphragm 7 is in communication with the atmosphere, as through a vent 9. With such construction, even if the tank 2 should be abruptly emptied completely, there will be no loss of the liquid-head in the leg 5, since the diaphragm 7 isolates the liquid column from the air and maintains it as an intact column. In the normal operation of the device also, changes in the position of the indicating liquid in the viewing gauge 3 responsive to changes in the level of the liquid in the container 2 proceed in normal manner.

By adding another boundary member or diaphragm separator, such as diaphragm 12, Fig. 2, both legs of the system may be separated from direct contact with the liquid in the tank although remaining in communication responsive to changes of the liquid level therein. Thus, the diaphragm chamber 13 has its upper portion, above the diaphragm 12, in communication with the tank 2a by a connection 14, while the lower portion is connected to the conduit leg 4a leading to the viewing gauge 3a, and the conduit leg 5a connecting to the lower portion of the diaphragm chamber 6a, while the space above the diaphragm 7a is in communication with the top of the tank through a connection 15. Again, the constant head leg 5a, by reason of the diaphragm 7a, is maintained constant regardless of vicissitudes of operation of the tank. Furthermore, it will be noticed that the tank liquid is in effect isolated from the liquid of the gauge system although it is in pressure-communication therewith, the diaphragm 12 allowing necessary movement in the gauge liquid to indicate the changes of the level in the tank. Such apparatus is in this way applicable to liquids otherwise not capable of being gauged by devices of this general character. For example, the liquid in the tank 2a may be an acid, and the tank and connections 14 and 15 may be of acid-proof construction, while the gauging system from the diaphragms on need not be.

In instances where there would be considerable difference in specific gravity as between a remote indicating system with water-filled conduits on the one hand, and a very dissimilar liquid in the tank on the other hand, a construction making possible the remote indicating and applying the same with high accuracy and convenience, may be had by adding another diaphragm chamber 18, Fig. 3, in the constant head conduit leg 5b leading to the viewing gauge 3b, the diaphragm chambers 6b and 13b remaining as in the case of Fig. 2 above-described. The portion below the diaphragm 19 of the chamber 18 is connected to the conduit 5b, while the portion above the diaphragm 19 is connected by a tube 20 to the portion of the diaphragm chamber 6b which is below the diaphragm 7b, and the space above such diaphragm communicates by a connection 15b, to the top of tank 2b which is to be gauged. Again, the portion of the diaphragm chamber 13b which is above the diaphragm 12b is in communication with the liquid in the tank by connection 14b, while the portion of the diaphragm chamber below the diaphragm 12b connects with the conduit leg 4b leading to the viewing gauge. In such arrangement the liquid which is in the tube 20 may be arranged to be of the same gravity or identical with the liquid in tank 2b, and no error is introduced into the viewing gauge from a discrepancy, since the column of reference opposite the liquid head in the tank is of the same specific gravity. Again, in such installation, it is immaterial what the liquid in the tank may be, whether incompatible with that in the viewing gauge or not, since the tank liquid is in a system isolated from the viewing gauge although the latter is in responsive communication.

Other modes of applying the principle of the invention may be employed, change being made as regards the details described, provided the features stated in the following claim, or the equivalent of such, be employed.

We therefore particularly point out and distinctly claim as our invention:

In remote-indicating liquid level gauge apparatus, a viewing gauge, a conduit communicating to one end of said gauge from the fluctuating head in a container to be gauged, a column of liquid under constant head and having its top closed external to such container, a conduit communicating the top of said column of liquid to the top of the container and a conduit communicating the bottom of said column of liquid to the other end of said gauge, a flexible diaphragm interposed between the container and the fluctuating head side of said gauge, a fluid-tight diaphragm forming the closure at the top of the constant head, and a flexible diaphragm interposed between said last-mentioned diaphragm and the gauge.

JOHN ROWLAND BROWN.
DEAN H. BROWNELL.